United States Patent [19]

Van Zanten et al.

[11] Patent Number: 5,301,563
[45] Date of Patent: Apr. 12, 1994

[54] CABLE ASSEMBLY FOR HEATER AIR CONTROL

[75] Inventors: David A. Van Zanten, Clawson; James J. Nagle, Birmingham, both of Mich.

[73] Assignee: Nagle Industries, Inc., Clawson, Mich.

[21] Appl. No.: 911,929

[22] Filed: Jul. 10, 1992

Related U.S. Application Data

[63] Continuation-in-part of Ser. No. 461,601, Jan. 5, 1990, Pat. No. 5,129,281.

[51] Int. Cl.⁵ .............................. F16C 1/22; F16C 1/10
[52] U.S. Cl. .............................. 74/501.5 R; 74/501.6; 74/506; 188/196 B; 192/111 A
[58] Field of Search ............ 74/501.5 R, 501.6, 502.5, 74/502.6, 506, 89.22; 192/111 A; 188/196 B, 196 D, 196 BA, 2 D

[56] References Cited

U.S. PATENT DOCUMENTS

| | | | |
|---|---|---|---|
| 732,057 | 6/1903 | Dring | 74/502.2 |
| 1,740,909 | 12/1929 | Shaw | 74/96 |
| 1,877,385 | 9/1932 | Casaletto | 188/196 B |
| 2,263,662 | 11/1941 | Waper | 74/96 |
| 2,770,454 | 11/1956 | Turtle | 268/21 |
| 3,088,449 | 6/1963 | Hockaday et al. | 74/501.6 |
| 3,363,881 | 1/1968 | Kobelt | 74/96 |
| 3,759,352 | 9/1973 | Toplis | 74/489 X |
| 3,943,794 | 3/1976 | Shimada | 74/501.5 R |
| 4,041,797 | 8/1977 | Mito | 74/501.5 R |
| 4,400,993 | 8/1983 | Kobayashi et al. | 74/501.5 R |
| 4,529,155 | 7/1985 | Bramwell et al. | 74/501.5 R |
| 4,691,584 | 9/1987 | Takaishi et al. | 74/471 R |
| 4,840,081 | 6/1989 | Nagano | 74/502.2 |
| 4,889,007 | 12/1989 | Senft et al. | 74/500.5 X |
| 4,907,465 | 3/1990 | Machida et al. | 74/506 X |
| 4,936,159 | 6/1990 | Kallio | 74/501.5 R |
| 5,105,672 | 4/1992 | Carson et al. | 74/501.5 R |
| 5,129,281 | 7/1992 | Van Zanten et al. | 74/501.5 R |

FOREIGN PATENT DOCUMENTS

| | | | |
|---|---|---|---|
| 945668 | 7/1956 | Fed. Rep. of Germany | 74/506 |
| 58-94665 | 6/1983 | Japan | 74/506 |
| 88/04716 | 6/1988 | World Int. Prop. O. | 74/506 |

*Primary Examiner*—Vinh T. Luong
*Attorney, Agent, or Firm*—Dinnin & Dunn

[57] ABSTRACT

A cable assembly for rotating a member in response to a rotating input, including first and second pulleys and at least one conduit extending longitudinally and interconnecting the first and second pulleys. At least one strand extends longitudinally through the conduit and at least partially about the first and second pulleys. The first pulley includes a slack adjustment mechanism for adjusting slack in the strands.

4 Claims, 5 Drawing Sheets

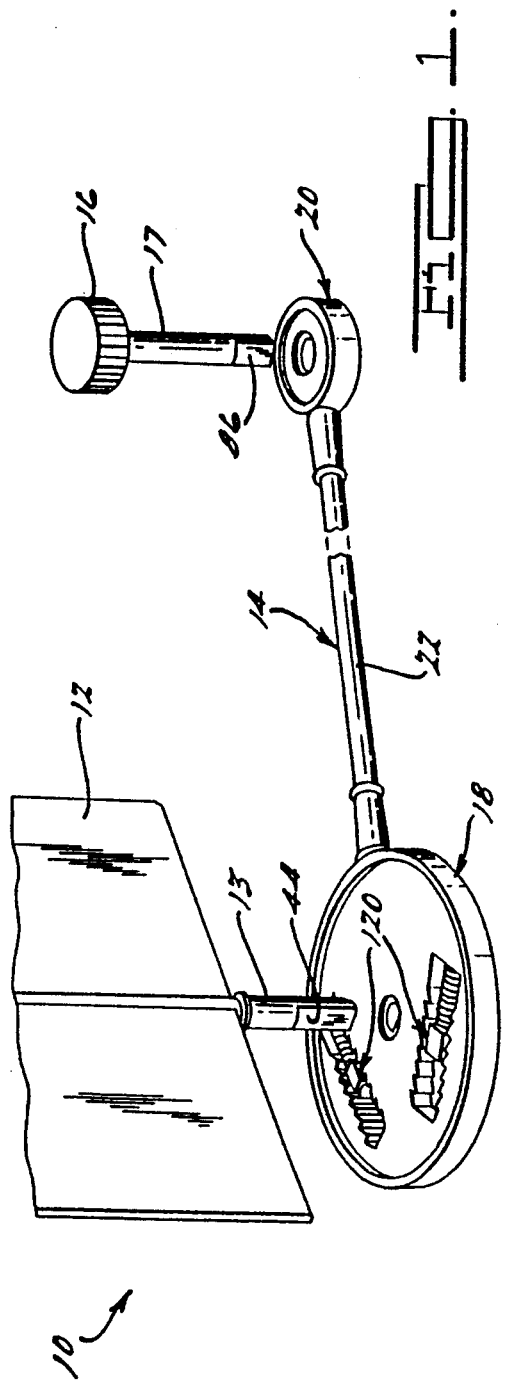
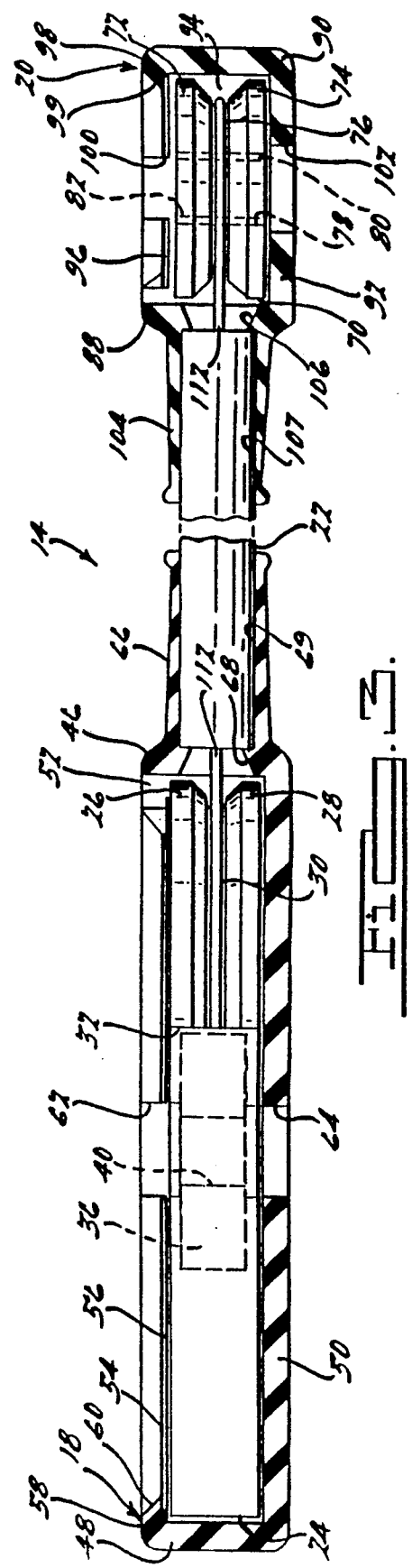

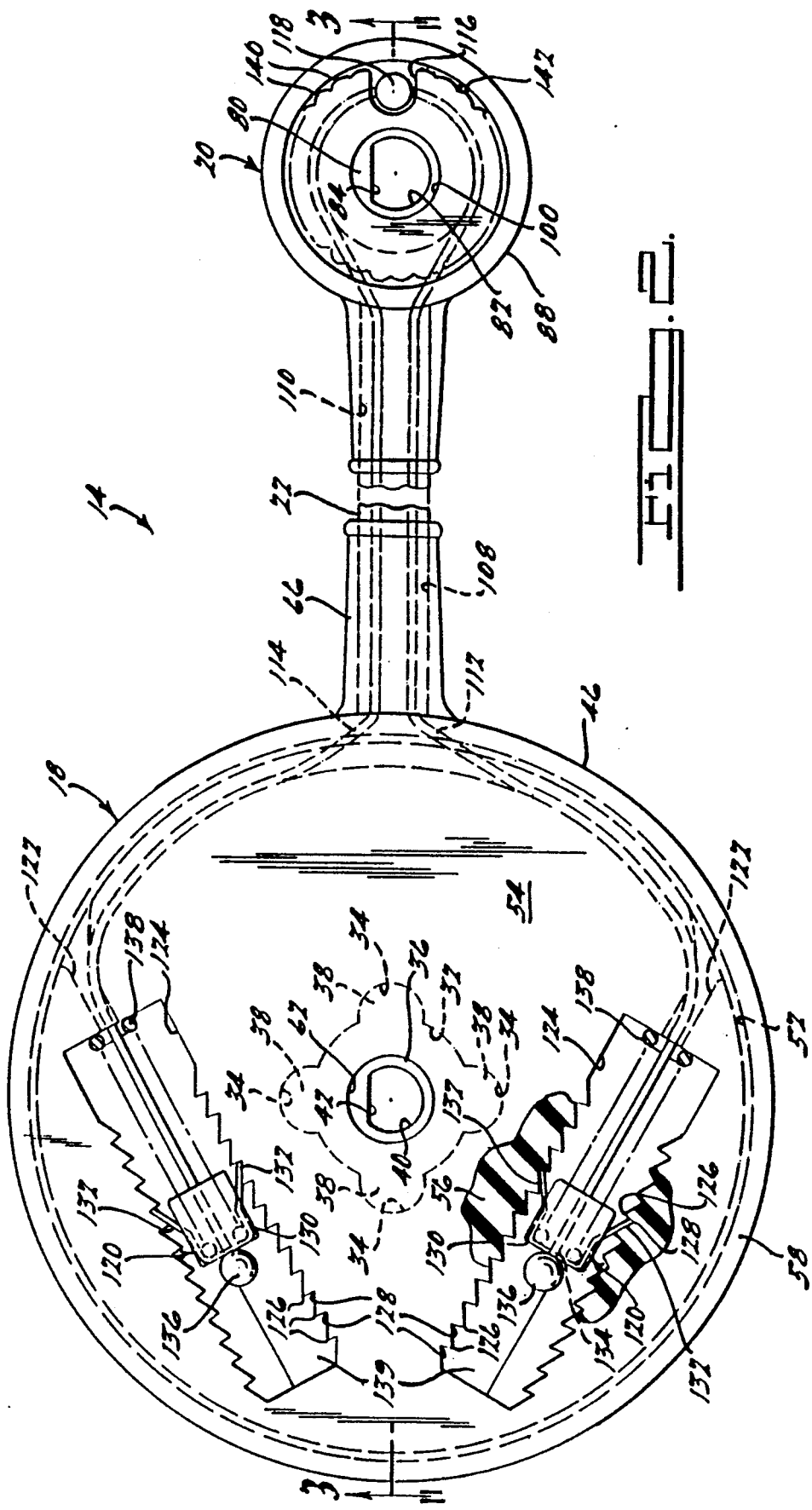

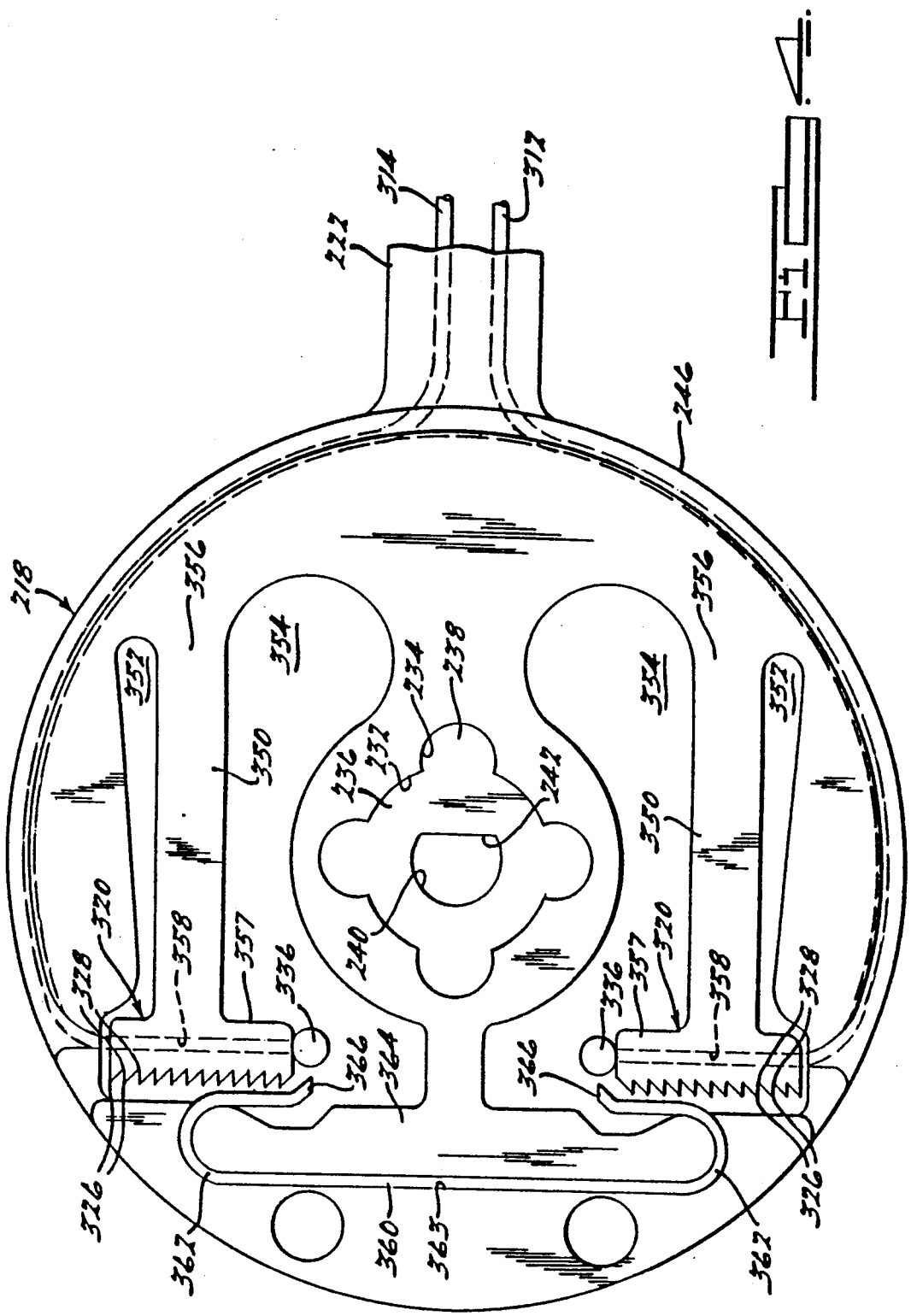

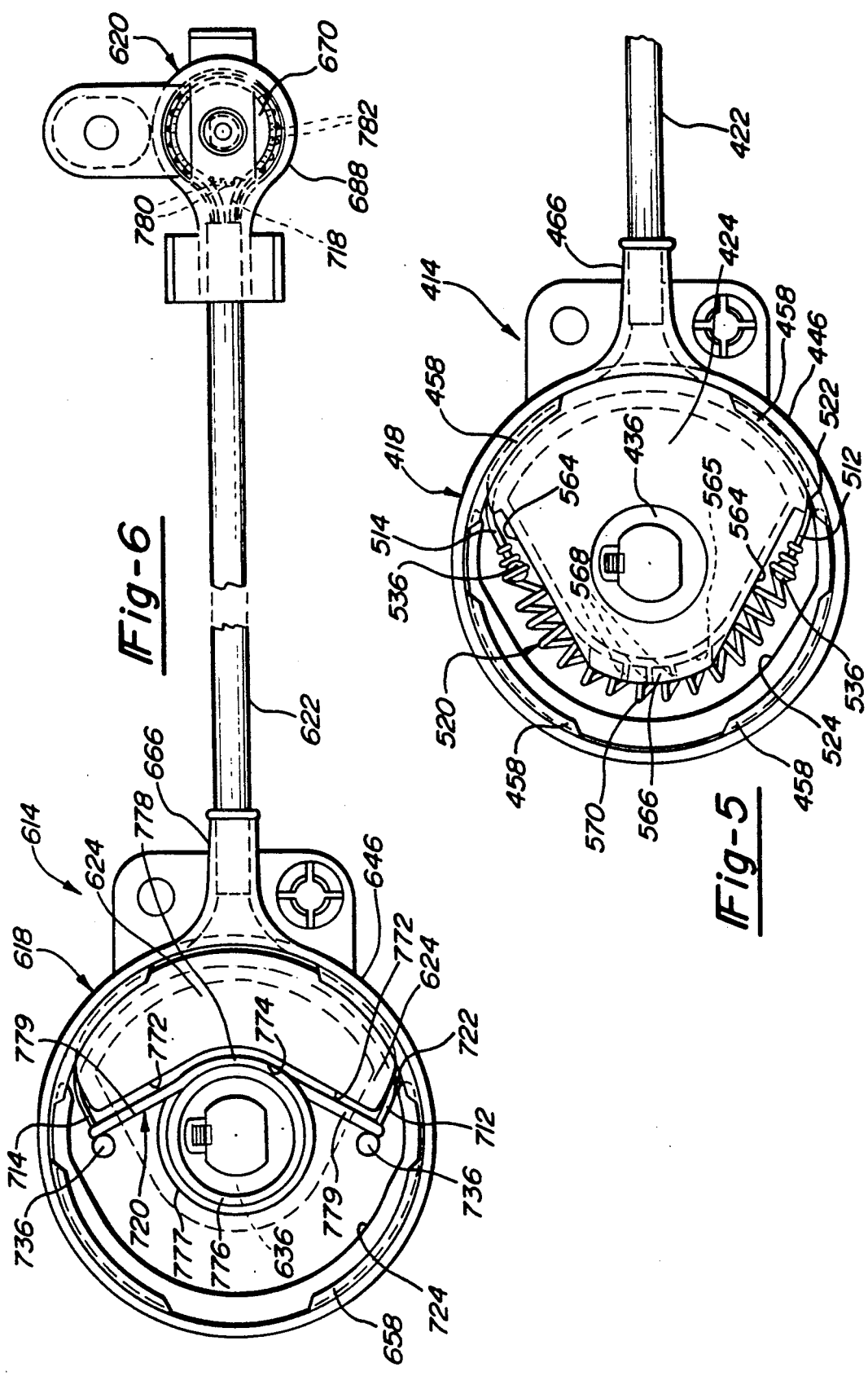

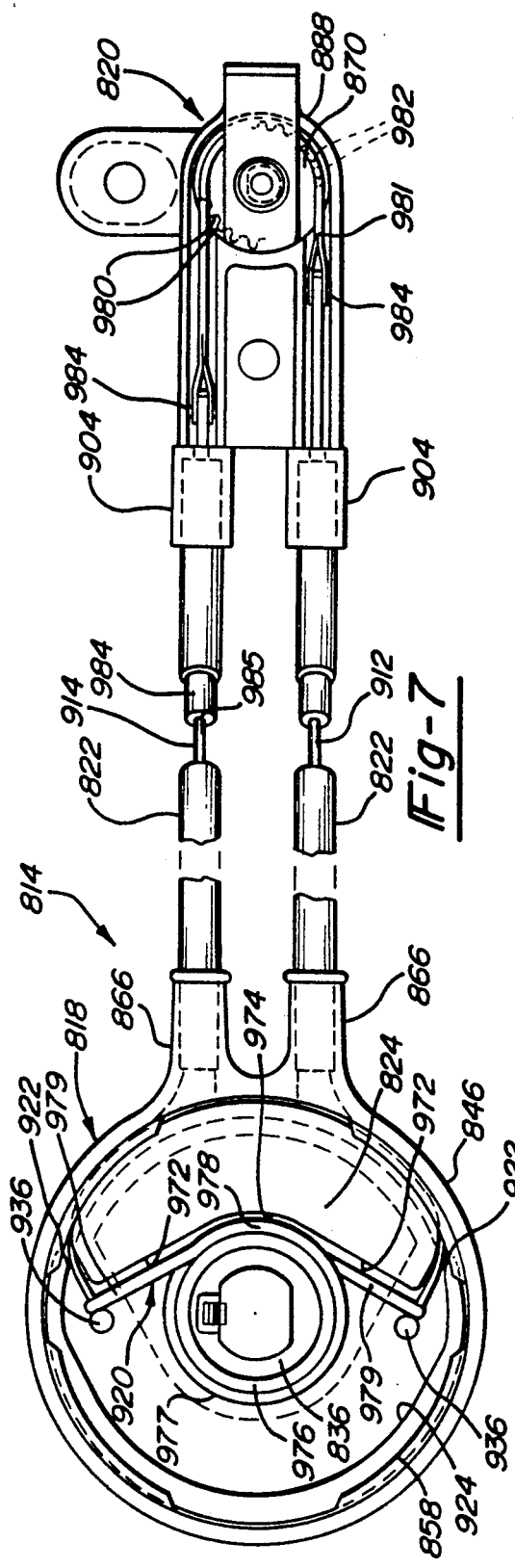
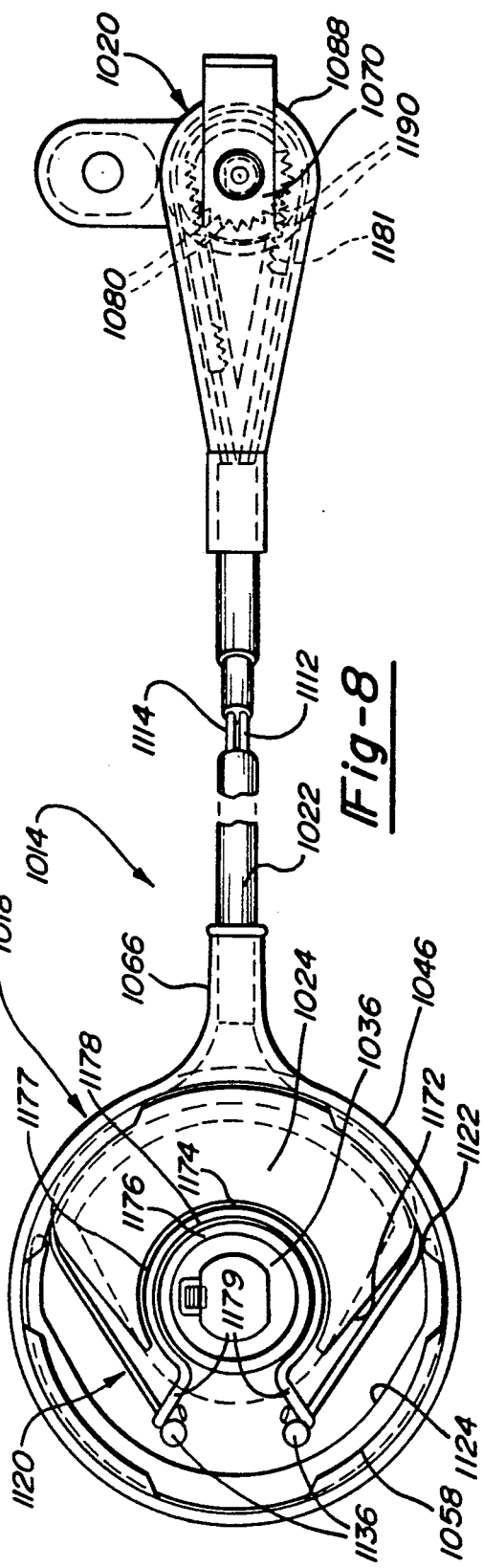

CABLE ASSEMBLY FOR HEATER AIR CONTROL

CROSS-REFERENCE TO RELATED APPLICATIONS

The present application is a continuation-in-part (CIP) of copending application, U.S. Ser. No. 07/461,601, filed Jan. 5, 1990 and entitled "CABLE ASSEMBLY FOR HEATER AIR CONTROL" now U.S. Pat. No. 5,129,281 issued on Jul. 14, 1992.

BACKGROUND OF THE INVENTION

1. Field of the Invention

The present invention relates generally to cables, and more particularly to, a cable assembly for rotating a vane for directing air over an engine of a vehicle to control heater air.

2. Description of Related Art

Previously, a cable assembly such as a vent cable has been used to rotate a vane or flap to direct air over an engine of a vehicle for controlling air for the heater. Typically, these cables have used a single strand of wire in a conduit having an actuating mechanism which moves the strand of wire similar to conventional push-pull devices.

One disadvantage with the above cable assemblies is that the strand of wire is typically in a state of compression when pushed. That is undesired because the strand may bind or buckle. As a result, larger diameter strands of wire have to be used. Another disadvantage is that a push-pull operation is used which may be undesired.

SUMMARY OF THE INVENTION

It is, therefore, one object of the present invention to provide a new and improved cable assembly for heater air control.

It is another object of the present invention to provide a slack adjustment mechanism for a cable assembly.

It is yet another object of the present invention to provide a cable assembly in which strands of wire are used in a state of tension only.

It is still another object of the present invention to eliminate the operation of push-pull as used in conventional heater control cables.

It is a further object of the present invention to provide a spring for slack adjustment in a cable assembly.

To achieve the foregoing objects, the present invention is a cable assembly for rotating a member in response to a rotating input, including first and second pulley means and conduit means extending longitudinally and interconnecting the first and second pulley means. A strand means extends longitudinally through the conduit means and about the second pulley means. The strand means has a pair of ends extending at least partially about the first pulley means. The first pulley means includes slack adjustment means for adjusting the slack in the strand means. The slack adjustment means includes a spring cooperating with each of the ends of the strand means.

One advantage of the present invention is that smaller diameter strands are used because the strands are used in tension only. Another advantage of the present invention is that the operation of push-pull is eliminated. Yet another advantage of the present invention is that torque and/or angular travel may be amplified or reduced by varying the size of the pulleys. A further advantage of the present invention is that the strands may have the slack taken up in several ways. A still further advantage of the present invention is that the cable assembly may be rotated freely. Yet another advantage of the present invention is that the direction of rotation of the pulleys may be easily changed from end to end. Still another advantage of the present invention is that a spring is used for taking up slack in the strands.

Other objects, features and advantages of the present invention will be readily appreciated as the same becomes better understood when viewed in light of the following description and accompanying drawings.

BRIEF DESCRIPTION OF THE DRAWINGS

FIG. 1 is a perspective view of a heater control arrangement incorporating a cable assembly according to the present invention.

FIG. 2 is a plan view of the cable assembly of FIG. 1.

FIG. 3 is a sectional view taken along line 3—3 of FIG. 2.

FIG. 4 is a plan view of a first alternate embodiment of the cable assembly of FIG. 1.

FIG. 5 is a plan view of a second alternate embodiment of the cable assembly of FIG. 1.

FIG. 6 is a plan view of a third alternate embodiment of the cable assembly of FIG. 1.

FIG. 7 is a plan view of a fourth alternate embodiment of the cable assembly of FIG. 1.

FIG. 8 is a plan view of a fifth alternate embodiment of the cable assembly of FIG. 1.

DESCRIPTION OF THE PREFERRED EMBODIMENT(S)

Referring to FIG. 1, a heater control arrangement 10 is shown. The heater control arrangement 10 includes a generally planar vane or flap 12 which is operatively connected by a support member 13 to one end of a cable assembly, generally indicated at 14, according to the present invention. The heater control arrangement 10 also includes a knob 16 operatively connected by a shaft member 17 which is connected to the other end of the cable assembly 14. The operation of the heater control arrangement 10 is such that when the knob 16 is rotated, the cable assembly 14 translates this rotational movement to rotate the vane 12 and direct air over an engine (not shown) of a vehicle (not shown) for controlling air for a heater (not shown). A more detailed description of the operation of the heater control arrangement 10 will be subsequently described.

Referring to FIGS. 2 and 3, the cable assembly 14 includes a first or large diameter pulley, generally indicated at 18, and a second or small diameter pulley, generally indicated at 20, interconnected by a longitudinally extending conduit 22. The large and small diameter pulleys 18 and 20 and conduit 22 are made from a plastic material. It should be appreciated that the pulley 18 has a diameter larger or greater than the pulley 20. It should also be appreciated that the diameter of the pulleys 18 and 20 could be equal or reversed in diameter or size.

The large diameter pulley 18 includes a first or large pulley member 24 having a pair of spaced and generally parallel circular flanges 26 and 28 of an enlarged diameter to form a notch or groove 30 therebetween of a smaller diameter. The large pulley member 24 has a generally concentric and circular aperture 32 extending diametrically therethrough. The aperture 32 includes four semi-circular radially extending recesses 34 similar to a "four leaf clover". A bushing 36 is disposed within the aperture 32 and is generally circular in shape. The bushing 36 is made from a metallic material. The bushing 36 includes four corresponding semi-circular and radially extending projections 38 which are adapted to be received or disposed in the recesses 34 of the aperture 32. The bushing 36 includes a generally concentric and circular aperture 40 having a flat 42 extending therethrough. The aperture 40 is adapted to receive a corresponding circular end of the support member 13 having a flat 44 (FIG. 1) to mate with flat 42 such that rotation of the large pulley member 24 and bushing 36 will rotate the support member 13 and vane 12.

The large diameter pulley 18 also includes a generally circular housing 46. The housing 46 has an annular side wall 48 and a generally circular bottom wall 50 which form a cavity 52. The large pulley member 24 is disposed within the cavity 52. A generally circular and planar plate member 54 is disposed adjacent an outer surface 56 of the flange 26 of the large pulley member 24. The plate member 56 and large pulley member 24 are secured in the cavity 52 by a flange 58 at the free end of the side wall 48 which extends radially inwardly and has an inclined or beveled surface 60. It should be appreciated that the large pulley member 24 is sandwiched between the plate member 54 and bottom wall 50 such that the large pulley member 24 is free to rotate within the cavity 52. It should also be appreciated that the bottom wall 50, side wall 48 and flange 58 are preferably integral.

The plate member 54 and bottom wall 50 each include an aperture 62 and 64 extending therethrough and generally concentrically aligned with the aperture 40 of the bushing 36. The housing 46 also includes a generally circular and tubular extension 66 extending radially outwardly from the side wall 48. An aperture 68 extends through the housing 46 and communicates with the cavity 52 and an interior 69 of the tubular extension 66. One end of the conduit 22 is disposed within the interior 69 of the tubular extension 66. It should be appreciated that the conduit 22 is secured within the tubular extension 66.

The small diameter pulley 20 includes a small pulley member 70 having a pair of spaced and generally parallel circular flanges 72 and 74 of an enlarged diameter to form a notch or groove 76 therebetween of a smaller diameter. The small pulley member 70 has a generally concentric and circular aperture 78 extending diametrically therethrough. A bushing 80 is disposed within the aperture 78 and is generally circular in shape. The bushing 80 is made from a metallic material. The bushing 80 includes a generally concentric and circular aperture 82 which has a flat 84 extending therethrough. The aperture 82 is adapted to receive a corresponding circular end of the shaft member 17 having a flat 86 (FIG. 1) to mate with the flat 84 such that rotation of the knob 16 will rotate the bushing 80 and small pulley member 70.

The small pulley member 70 also includes a generally circular housing 88. The housing 88 has an annular side wall 90 and a generally circular bottom wall 92 which form a generally circular cavity 94. The small pulley member 70 is disposed within the cavity 94. A generally planar and circular plate member 96 is disposed adjacent the flange 72 of the small pulley member 70. The small pulley member 70 and plate member 96 are secured within the cavity 94 by a flange 98 at the free end of the side wall 90 which extends radially inwardly and has an inclined or beveled surface 99. It should be appreciated that the small pulley member 70 is sandwiched between the plate member 96 and bottom wall 92 such that the small pulley member 70 is free to rotate within the cavity 94. It should also be appreciated that the bottom wall 92, side wall 90 and flange 98 are preferably integral. It should further be appreciated that the small pulley member 70 has a diameter less than the large pulley member 24.

The plate member 96 and bottom wall 92 each include a generally circular aperture 100 and 102 extending therethrough and generally concentrically aligned with the aperture 82 of the bushing 80. The housing 88 also includes a generally circular and tubular extension 104 extending radially outwardly from the side wall 90. An aperture 106 extends through the housing 88 and communicates with the cavity 94 and an interior 107 of the tubular extension 104. The other end of the conduit 22 is adapted to be disposed within the interior 107 of the tubular extension 104. It should be appreciated that the conduit 22 is secured within the tubular extension 104.

The conduit 22 is generally circular in cross-sectional shape and extends longitudinally. The conduit 22 includes a pair of transversely spaced and longitudinally extending passageways 108 and 110 throughout the length thereof. A pair of strands 112 and 114 such as of metal wire are disposed within the passageways 108 and 110, respectively. The strand 112 extends through the passageway 108 and the groove 76 and partially about the small pulley member 70 to a U-shaped recess 116 thereof. The strand 114 extends through the passageway 110 and groove 76 and partially about the small pulley member 70 on the other side thereof to the U-shaped recess 116. Preferably, the strands 112 and 114 are one continuous strand. It should be appreciated that strands 112 and 114 could be two separate strands having their ends staked together and held in place by a metal cylindrical member 118 disposed in the U-shaped recess 116. In the preferred embodiment, the strands 112 and 114 are a continuous strand which extends through an aperture (not shown) in the cylindrical member 118 and compressed or pinched to secure the cylindrical member 118 to the strand. It should also be appreciated that the U-shaped recess 116 and cylindrical member 118 cooperate together to prevent the strands 112 and 114 from slipping or rotating relative to the small pulley member 70. The other end of the strands 112 and 114 extend through the corresponding passageways 108 and 110 and groove 30 and partially about the large pulley member 24. Each of the strands 112 and 114 extend into a slack adjustment mechanism, generally indicated at 120 in the large pulley member 24. The slack adjustment mechanism 120 takes up the slack or adjusts the tension in each of the strands 112 and 114.

The slack adjustment mechanism 120 includes a passageway 122 extending into a generally rectangular channel 124 in the large pulley member 24. The passageway 122 and channel 124 extend inwardly radially at an angle. The channel 124 includes a plurality of teeth 126 which are spaced by grooves 128. The teeth 126 are generally V-shaped and formed in a "christmas tree" pattern. A generally rectangular retainer member 130 has a pair of transversely spaced and longitudinally and outwardly extending tangs 132 which are adapted to engage the grooves 128 between the teeth 126. Each strand 112 and 114 extend through an aperture 134 in one end of the retainer member 130. A generally spherically shaped ball 136 is staked onto the end of each strand 112 and 114 to prevent the strand 112 and 114 from exiting or disengaging the aperture 134 and retainer member 130. A spring 138 is disposed about each strand 112 and 114 between one end of the retainer member 130 and one end of the channel 134. The spring 138 preloads or bias the retainer member 130 toward the opposite end of the channel 134. Preferably, only a portion 139 of the plate member 54 extends partially over the channel 124 to prevent the retainer member 130 from exiting vertically or axially outwardly from the channel 124 while allowing a tool to move the retainer member 130 along the channel 124.

Additionally, the small pulley member 70 may include a plurality of circumferentially spaced teeth 140 which cooperate with a post member 142 to produce a noise such as a "click". It should be appreciated that this feature is optional.

In operation, the strands 112 and 114 are extended through the passageways 108 and 110 of the conduit 22. The strands 112 and 114 are guided in the groove 76 around the small pulley member 70. The strands 112 and 114 are secured to the cylindrical member 118 which is disposed in the U-shaped recess 116. The other end of the strands 112 and 114 are guided in groove 30 partially around the large pulley member 24 and into passageways 122. The springs 138 are disposed about the strands 112 and 114. The strands 112 and 114 are extended through aperture 134 in retainer member 130. The ball 136 is then staked to each end of the strands 112 and 114.

The retainer member 130 and spring 138 are disposed at the non-toothed end of the channel 124. A tool such as a screwdriver is used to move the retainer member 130 toward the opposite or toothed end of the channel 124. The tangs 132 are deflected inwardly as they contact the teeth 126 and extend or flex outwardly when disposed in the space 128 between the teeth 126. As the retainer member 130 moves along the channel 124, the slack in the strands 112 and 114 is taken up to extend the strands 112 and 114 and increase the tension in strands 112 and 114. When the strands 112 and 114 are taut, the tangs 132 engage the teeth 126 in the next available or adjacent space 128.

The cylindrical end of shaft member 17 is disposed in aperture 82 of the bushing 80 for the small pulley member 70. The cylindrical end of support member 13 is disposed in aperture 40 of bushing 36 for the large pulley member 24. The knob 16 may be rotated in either direction to rotate the small pulley member 70, which in turn, rotates the large pulley member 24 in the same direction, in turn, rotating vane 12.

Referring to FIG. 4, a first alternate embodiment of the cable assembly 14 is shown. Like parts have like numerals increased by two hundred (200). The slack adjustment mechanism 320 of the large pulley member 224 includes a pair of transversely spaced and generally parallel arms 350 which are separated on each side by spaces 352 and 354 in the large pulley member 224. The arms 350 are generally T-shaped and are hinged at 356 to the remainder of the large pulley member 224. The free end 357 of the arms 350 and 352 include a channel 358 extending transversely therethrough. The strands 312 and 314 extend through the channels 358 and have a ball 336 staked at one end thereof to prevent the strands 312 and 314 from exiting or disengaging channels 358. Each arm 350 includes a plurality of teeth 326 spaced by grooves 328 on the outer free end thereof. A transversely extending spring member 360 has C-shaped ends 362 and is disposed in a groove 363 about a extension 364 of the large pulley member 324. The C-shaped ends 362 have an outwardly and inclined extending portion 366 which is adapted to engage a space 328 between the teeth 326.

The operation of the cable assembly 214 is similar to the cable assembly 14. For the slack adjustment mechanism 320, a tool such as a screwdriver is used to move the arms 350 toward each other such that the portion 366 contacts the teeth 326 and is deflected inwardly and extends or flexes outwardly in a space 328 as the arms 350 move toward each other, the slack in the strands 312 and 314 is taken up to extend the strands 312 and 314 and increase the tension in the strands 312 and 314. When the strands 312 and 314 are taut, the projections 366 engage the teeth 326 in the next available or adjacent space 329.

Referring to FIG. 5, a second alternate embodiment of the cable assembly 14 is partially shown. Like parts have like numerals increased by four hundred (400). For the cable assembly 414, the slack adjustment mechanism 520 includes a passageway 522 extending into each end of a generally arcuate shaped channel 524 in the large pulley member 424. The large pulley member 424 has a pair of generally inclined inner surface portions 564 and a generally arcuate inner surface portion 565 interconnecting the inclined surface portions 564 to form an inner surface of the channel 524. The large pulley member 424 has a flange 566 extending from the arcuate inner surface portion 565 into and partially overlapping the channel 524. The large pulley member 424 includes at least one, preferably a plurality of projections 568 spaced from each other along the arcuate inner surface portion 565 and extending into the channel 524. The strands 512 and 514 extend through the passageways 522 and into the channel 524. A retainer such as a ball 536 is staked at one end of each strand 512 and 514 to prevent the strands 512 and 514 from exiting or disengaging the channel 524. A spring 570 is disposed in the channel 524. The spring 570 includes an arcuate central portion 570a and a pair of inclined arm portions 570b extending outward from the central portion 570a. The spring 570 is partially disposed beneath the flange 566 and engages the projections 568. The ends of the spring 570 are disposed about the balls 536 and strands 512 and 514. Preferably, the spring 570 is a coil spring of a size and length to provide sufficient tension on the strands 512 and 514 to take up slack therein.

The operation of the cable assembly 414 is similar to the cable assembly 14. For the slack adjustment mechanism 520, the spring 570 takes up slack in the strands 512 and 514 and increases the tension therein. The spring 570 is stretched to pull on the strands 512 and 514. Each strand 512, 514 can be selectively adjusted by positioning the spring 570 along the arcuate inner surface portion 565 such that the projections 568 engage different coils of the spring 570 to lengthen or shorten the spring 570 relative to the strand 512, 514. When the small pulley member is rotated, the strand 512, 514 pulls on the spring 570 and the engagement between the spring 570 and projections 568 rotates the large pulley member 424.

Referring to FIG. 6, a third alternate embodiment of the cable assembly 14 is shown. Like parts have like numerals increased by six hundred (600). For the cable assembly 614, the slack adjustment mechanism 720 includes a passageway 722 extending into each end of a channel 724 in the large pulley member 624. The large pulley member 624 has a pair of generally inclined inner surface portions 772 and a generally arcuate inner surface portion 774 interconnecting the inclined surface portions 772 to form an inner surface of the channel 724. The large pulley member 624 includes a spring bushing 776 disposed about the central bushing 636. The strands 712 and 714 extend through the passageways 722 and into the channel 724. A retainer such as a ball 736 is staked at one end of each strand 712 and 714 to prevent the strands 712 and 714 from exiting or disengaging the channel 724. A spring 777 is disposed in the channel 724 and has a generally arcuate, preferably circular, central portion 778 disposed or wound about the spring bushing 776 and generally inclined arm portions 779 disposed about the strands 712 and 714 and abutting the balls 736. The spring 777 is of a size to provide sufficient tension on the strands 712 and 714 to take up slack therein.

The small diameter pulley 620 includes a small pulley member 670 in the form of a gear. The small pulley member 670 has a plurality of teeth 780 spaced circumferentially thereabout. The strands 712 and 714 are connected to a secondary strand 781 disposed about the small pulley member 670. The secondary strand 781 is a linear tape having a plurality of apertures 782 to cooperate or mate with the teeth 780 of the small pulley member 670. The secondary strand 781 may be made of a suitable material such as plastic and connected by suitable means such as fasteners (not shown) to the strands 712 and 714.

The operation of the cable assembly 614 is similar to the cable assembly 14. For the slack adjustment mechanism 720, the spring 777 takes up slack in the strands 712 and 714 to extend the strands 712 and 714 and increase the tension therein. The spring 777 pulls on the strands 712 and 714 since the arm portions 779 are urged toward each other. When the small pulley member 670 is rotated, the teeth 780 engage and disengage the apertures 782 in the secondary strand 781 to move the strands 712, 714 and 781. The strands 712 and 714 pull on the spring 778 and since the spring 778 is disposed about the spring bushing 776, the large pulley member 624 is rotated.

Referring to FIG. 7, a fourth alternate embodiment of the cable assembly 14 is shown. Like parts have like numerals increased by eight hundred (800). Like parts of the cable assembly 714 also have like numerals increased by two hundred (200). The large diameter pulley 818 includes a generally circular housing 846. The housing 846 also includes a pair of laterally spaced and generally circular and tubular extensions 866 extending radially outwardly. The cable assembly 814 also includes a pair of conduits 822. One end of one conduit 822 is disposed within one tubular extension 866 and one end of the other conduit 822 is disposed within one other tubular extension 866. The conduits 822 may include insulation 984 or the like therein and forming passageways 985 for the strands 912 and 914. It should be appreciated that one strand 912 extends through one conduit 822 and the other strand 914 extends through the other conduit 822.

The small diameter pulley 820 includes a generally circular housing 888. The housing 888 also includes a pair of laterally spaced and generally circular and tubular extensions 904 extending radially outwardly. One end of one conduit 822 is disposed within one tubular extension 904 and one end of the other conduit 90 is disposed within the other tubular extension 904.

The small diameter pulley 820 includes a small pulley member 870 in the form of a gear. The small pulley member 870 has a plurality of teeth 980 spaced circumferentially thereabout. The strands 712 and 714 are connected to a secondary strand 981 disposed about the small pulley member 870. The secondary strand 981 is a linear tape having a plurality of apertures 982 to cooperate or mate with the teeth 980 of the small pulley member 870. The secondary strand 981 may be made of a suitable material such as plastic and connected by fasteners 984 such as rivets to the strands 712 and 714.

The operation of the cable assembly 814 is similar to the cable assembly 14. For the slack adjustment mechanism 920, the spring 978 takes up slack in the strands 912 and 914 to extend the strands 912 and 914 and increase the tension therein. The spring 978 pulls on the strands 912 and 914 since the arm portions 979 are urged toward each other. When the small pulley member 870 is rotated, the teeth 980 engage and disengage the apertures 982 in the secondary strand 981 to move the strands 912, 914 and 981. The strands 912 and 914 pull on the spring 978 and since the spring 978 is disposed about the spring bushing 976, the large pulley member 824 is rotated.

Referring to FIG. 8, a fifth alternate embodiment of the cable assembly 14 is shown. Like parts have like numerals increased by one thousand (1000). For the cable assembly 1014, the slack adjustment mechanism 1120 includes a passageway 1122 extending into each end of a channel 1124 in the large pulley member 1024. The large pulley member 1024 has a pair of generally inclined inner surface portions 1172 and a generally arcuate inner surface portion 1174 interconnecting the inclined surface portions 1172 to form an inner surface of the channel 1124. The large pulley member 1024 includes a spring bushing 1176 disposed about the central bushing 1036. The strands 1112 and 1114 extend through the passageways 1122 and into the channel 1124. A retainer such as a ball 1136 is staked at one end of each strand 1112 and 1114 to prevent the strands 1112 and 1114 from exiting or disengaging the channel 1124. A spring 1177 is disposed in the channel 1124 and has a generally arcuate central portion 1178 disposed about the spring bushing 1176 and generally inclined arm portions 1179 disposed the strands 1112 and 1114 and abut the ball 1136. The spring 1177 is of a size to provide sufficient tension on the strands 1112 and 1114 to take up slack therein.

The small diameter pulley 1020 includes a small pulley member 1070 in the form of a gear. The small pulley member 1070 has a plurality of teeth 1080 spaced circumferentially thereabout. The strands 1112 and 1114 are connected to a secondary strand 1181 disposed about the small pulley member 1070. The secondary strand 1181 is a linear member having a plurality of teeth 1190 to cooperate or mate with the teeth 1180 of the small pulley member 1070. The secondary strand 1181 may be made of a suitable material such as plastic and connected by suitable means to the strands 1112 and 1114.

The operation of the cable assembly 1014 is similar to the cable assembly 14. For the slack adjustment mechanism 1120, the spring 1177 takes up slack in the strands 1112 and 1114 to extend the strands 1112 and 1114 and increase the tension therein. The spring 1177 pulls on the strands 1112 and 1114 since the arm portions 1179 are urged toward each other. When the small pulley member 1070 is rotated, the teeth 1180 engage and disengage the teeth 1190 on the secondary strand 1181 to move the strands 1112, 1114 and 1181. The strands 1112 and 1114 pull on the spring 1177 and since the spring 1177 is disposed about the spring bushing 1176, the large pulley member 1024 is rotated.

Accordingly, the torque or angular travel may be varied by changing the diameter of the pulleys. Also, the strands are in tension only, eliminating any push-pull operation or compression on the strands. Further, the slack in the strands may be taken up in several ways.

The present invention has been described in an illustrative manner. It is to be understood that the terminology which has been used is intended to be in the nature of words of description rather than of limitation.

Many modifications, variations of the present invention are possible in light of the above teaching. Therefore, within the scope of the appended claims, the present invention may be practiced otherwise and as specifically described.

What is claimed is:

1. A cable assembly for rotating a member in response to a rotating input, comprising:
   first and second pulley means;
   conduit means extending longitudinally and interconnecting said first and second pulley means;
   strand means extending longitudinally through said conduit means and about said second pulley means, said strand means having a pair of ends extending at least partially about said first pulley means;
   said first pulley means including slack adjustment means for adjusting slack in said strand means, said slack adjustment means including a spring cooperating with each of said ends of said strand means; and
   said spring has an arcuate central portion and a pair of inclined arm portions extending outwardly from said central position.

2. A cable assembly as set forth in claim 1 wherein said spring comprises a coil spring.

3. A cable assembly for rotating a member in response to a rotating input, comprising:
   first and second pulleys;
   at least one conduit extending longitudinally and interconnecting said first and second pulleys;
   at least one strand extending longitudinally through said at least one conduit and about said second pulley;
   said at least one strand having first and second ends, said first and second ends extending partially about said first pulley;
   said first pulley including a spring cooperating with said first and second ends for adjusting slack in said at least one strand;
   said first pulley includes a channel, retainers disposed in said channel and secured to said first and second ends, said spring being disposed in said channel and about said at least one strand; and
   said spring has an arcuate central portion and a pair of inclined arm portions extending outwardly form said central portion.

4. A cable assembly as set forth in claim 3 wherein said spring comprises a coil spring.

* * * * *

UNITED STATES PATENT AND TRADEMARK OFFICE
CERTIFICATE OF CORRECTION

PATENT NO. : 5,301,563

DATED : April 12, 1994

INVENTOR(S) : David A. Van Zanten and James J. Nagle

It is certified that error appears in the above-identified patent and that said Letters Patent is hereby corrected as shown below:

On the title page, item [56]:
In References Cited --54-31143  1979 Japan-- should be added.

Column 7, line 67, "90" should be --904--.

Signed and Sealed this

Eighteenth Day of October, 1994

Attest:

BRUCE LEHMAN

Attesting Officer

Commissioner of Patents and Trademarks